(12) United States Patent
Samaroo

(10) Patent No.: US 10,736,414 B2
(45) Date of Patent: *Aug. 11, 2020

(54) ORAL CARE IMPLEMENT

(71) Applicant: Colgate-Palmolive Company, New York, NY (US)

(72) Inventor: Derek Samaroo, Edison, NJ (US)

(73) Assignee: Colgate-Palmolive Company, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/251,875

(22) Filed: Jan. 18, 2019

(65) Prior Publication Data

US 2019/0150604 A1 May 23, 2019

Related U.S. Application Data

(63) Continuation of application No. 14/911,484, filed as application No. PCT/US2013/054669 on Aug. 13, 2013, now Pat. No. 10,213,013.

(51) Int. Cl.
*A46B 15/00* (2006.01)
*B65B 63/00* (2006.01)
*G06K 9/18* (2006.01)
*G06K 1/12* (2006.01)

(52) U.S. Cl.
CPC ........ *A46B 15/0085* (2013.01); *B65B 63/005* (2013.01); *G06K 1/121* (2013.01); *G06K 9/18* (2013.01); *A46B 2200/1066* (2013.01)

(58) Field of Classification Search
CPC ....................................................... G06K 9/18
See application file for complete search history.

(56) References Cited

U.S. PATENT DOCUMENTS

| 4,201,338 A * | 5/1980 | Keller ................... B07C 5/3412 235/454 |
| 4,403,548 A | 9/1983 | Faller ....................... B41C 1/18 101/368 |
| 4,900,252 A | 2/1990 | Liefke |
| 5,072,477 A | 12/1991 | Pai |

(Continued)

FOREIGN PATENT DOCUMENTS

| CN | 2787053 | 6/2006 |
| CN | 101102697 | 1/2008 |

(Continued)

OTHER PUBLICATIONS

International Search Report and the Written Opinion of the International Searching Authority issued in International Patent Application PCT/US2013/054669 dated May 9, 2014.

*Primary Examiner* — Christle I Marshall

(57) ABSTRACT

An oral care implement having an optical machine-readable representation of data, such as a barcode. The oral care implement may include a plurality of protrusions that at least partially define the optical machine-readable representation of data. Specifically, portions of the plurality of protrusions have a color that visually contrasts with a color of a surface that is exposed between the plurality of protrusions. Thus, the protrusions and the exposed surface collectively form the optical machine-readable representation of data. The oral care implement may include a soft tissue cleaner that forms the optical machine-readable representation of data.

20 Claims, 3 Drawing Sheets

(56) References Cited

U.S. PATENT DOCUMENTS

| | | | | |
|---|---|---|---|---|
| 5,268,566 A | 12/1993 | Wakaumi | | G06K 1/125 |
| | | | | 235/462.01 |
| 5,527,407 A | 6/1996 | Gartland | | B29C 37/0025 |
| | | | | 156/116 |
| 5,700,998 A | 12/1997 | Palti | | A61J 3/007 |
| | | | | 235/375 |
| 5,917,174 A | 6/1999 | Moore | | G06K 7/10891 |
| | | | | 235/462.44 |
| 5,996,892 A | 12/1999 | Meadows | | B29C 33/14 |
| | | | | 235/462.01 |
| 6,149,060 A | 11/2000 | Meadows | | B29C 33/14 |
| | | | | 235/454 |
| 7,153,381 B2 | 12/2006 | Majumdar | | G09F 3/04 |
| | | | | 152/525 |
| 8,893,978 B2 | 11/2014 | Lau | | G06K 1/20 |
| | | | | 235/494 |
| 8,978,278 B1* | 3/2015 | Rossi | | A46B 15/00 |
| | | | | 40/314 |
| 10,152,661 B2* | 12/2018 | Kieser | | G06K 19/06046 |
| 10,213,013 B2* | 2/2019 | Samaroo | | A46B 15/0085 |
| 2003/0045814 A1 | 3/2003 | Sangha | | |
| 2003/0010526 A1 | 6/2003 | Hilscher et al. | | |
| 2003/0101526 A1 | 6/2003 | Hilscher | | |
| 2004/0134007 A1* | 7/2004 | Davies | | A46B 15/0055 |
| | | | | 15/110 |
| 2006/0010628 A1 | 1/2006 | Moskovich | | A64B 15/0055 |
| | | | | 15/111 |
| 2007/0186417 A1 | 8/2007 | Smyth | | G06K 7/14 |
| | | | | 235/494 |
| 2009/0072610 A1 | 3/2009 | Sorrentino et al. | | |
| 2009/0215003 A1 | 8/2009 | Jacobs | | |
| 2010/0012736 A1 | 1/2010 | Wilds | | G06K 7/14 |
| | | | | 235/494 |
| 2010/0055423 A1 | 3/2010 | Chretien | | C09D 11/101 |
| | | | | 428/209 |
| 2010/0257683 A1 | 10/2010 | Boyd | | A46B 9/005 |
| | | | | 15/167.1 |
| 2011/0076647 A1 | 3/2011 | Ditzel | | |
| 2011/0087605 A1* | 4/2011 | Pond | | G06Q 30/012 |
| | | | | 705/302 |
| 2011/0152909 A1 | 6/2011 | Jimenez | | A61B 17/244 |
| | | | | 606/161 |
| 2012/0151697 A1 | 6/2012 | Farrell et al. | | |
| 2013/0071807 A1* | 3/2013 | Doll | | A61N 1/32 |
| | | | | 433/27 |
| 2013/0274774 A1 | 10/2013 | Jimenez | | A61B 17/244 |
| | | | | 606/161 |
| 2016/0183672 A1* | 6/2016 | Samaroo | | A46B 15/0085 |
| | | | | 382/182 |
| 2017/0007013 A1* | 1/2017 | Pariseau | | A46B 15/0071 |
| 2018/0339433 A1* | 11/2018 | Lin | | B29C 45/263 |
| 2019/0021656 A1* | 1/2019 | Suri | | A61B 5/4833 |
| 2019/0046290 A1* | 2/2019 | Pond | | G06Q 30/012 |

FOREIGN PATENT DOCUMENTS

| | | | | |
|---|---|---|---|---|
| CN | 201422557 Y | 3/2010 | | |
| CN | 201929296 U | 8/2011 | | |
| CN | 102440518 | 5/2012 | | |
| DE | 19703822 | 6/1998 | | |
| DE | 10224043 | 12/2003 | | |
| EP | 0848921 | 6/1998 | | |
| GB | 2307762 A | * 6/1997 | | G06K 19/06037 |
| GR | 1007921 | 6/2013 | | |
| WO | WO 2006/055369 A1 | 5/2006 | | |
| WO | WO 2009/038931 A2 | 3/2009 | | |
| WO | WO 2009/108470 A1 | 9/2009 | | |
| WO | WO 2011/150302 | 12/2011 | | |

\* cited by examiner

ORAL CARE IMPLEMENT

CROSS-REFERENCE TO RELATED APPLICATIONS

The present application is a continuation of U.S. patent application Ser. No. 14/911,484, filed Feb. 11, 2016, which is a U.S. national stage application under 35 U.S.C. § 371 of PCT Application No. PCT/US2013/054669, filed Aug. 13, 2013, the entireties of which are incorporated herein by reference.

BACKGROUND

The present invention relates to oral care implements, such as toothbrushes.

When a consumer purchases an oral care implement, the oral care implement typically is provided in a package, such as a blister pack or a carton, which includes information, such as a stock keeping unit (SKU), identifying the oral care implement packaged therein. Once the oral care implement has been removed from the package, the consumer typically disposes of the package. Subsequent to the disposal of the package, and usually after repeated use of the oral care implement, the consumer may wish to purchase another example of the same type of oral care implement. However, without the package that the oral care implement was originally provided in, the consumer can find it very difficult to identify the type of oral care implement they wish to purchase from the vast array of oral care implements on the market today.

Accordingly, there is a need for an oral care implement that aids a consumer's identification of the oral care implement.

BRIEF SUMMARY

An oral care implement having an optical machine-readable representation of data, such as a barcode. The oral care implement may include a plurality of protrusions that at least partially define the optical machine-readable representation of data. Specifically, portions of the plurality of protrusions have a color that visually contrasts with a color of a surface that is exposed between the plurality of protrusions. Thus, the protrusions and the exposed surface collectively form the optical machine-readable representation of data. The oral care implement may include a soft tissue cleaner that forms the optical machine-readable representation of data.

In one aspect, the invention may be an oral care implement comprising: a body comprising a handle portion and a head portion; and an optical machine-readable representation of data located on the body.

In another aspect, the invention may be an oral care implement comprising: a body comprising a handle portion and a head portion, the head portion having a first side and a second side opposite the first side; a soft tissue cleaner positioned on the second side of the head portion, the soft tissue cleaner comprising a plurality of protrusions that extend from the second side of the head portion; and wherein the plurality of protrusions of the soft tissue cleaner at least partially define an optical machine-readable representation of data.

In yet another aspect, the invention may be an oral care implement comprising: a body comprising a handle portion and a head portion; and a monolithic mass of elastomeric material coupled to the body, the monolithic mass of elastomeric material comprising a pad and a plurality of protrusions, the monolithic mass of elastomeric material defining an optical machine-readable representation of data.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

In the following description, the invention is embodied in a manually-operated oral care implement, more specifically a manually-operated toothbrush. However, in other embodiments, the invention is embodied in a powered toothbrush wherein one or more cleaning elements provided to the head of the implement are drivable so as to be moved relative to the handle of the implement. In still further embodiments, the invention may be embodied in other forms of oral care implements, such as a soft-tissue cleaner, a tooth polisher, an interdental brush, a tongue scraper, or another implement designed for oral care. It is to be understood that other embodiments may be utilized, and that structural and functional modifications may be made without departing from the scope of the present invention.

Figure 1:
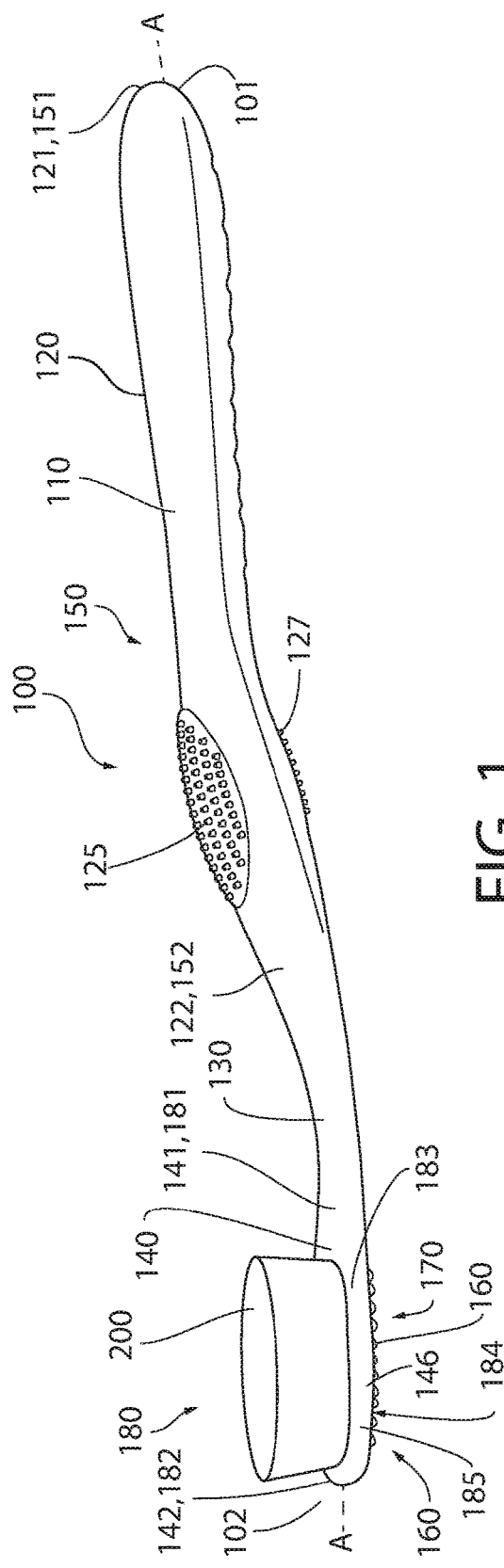
FIG. 1 shows a perspective view of an oral care implement according to an embodiment of the present invention.
Figure 2:
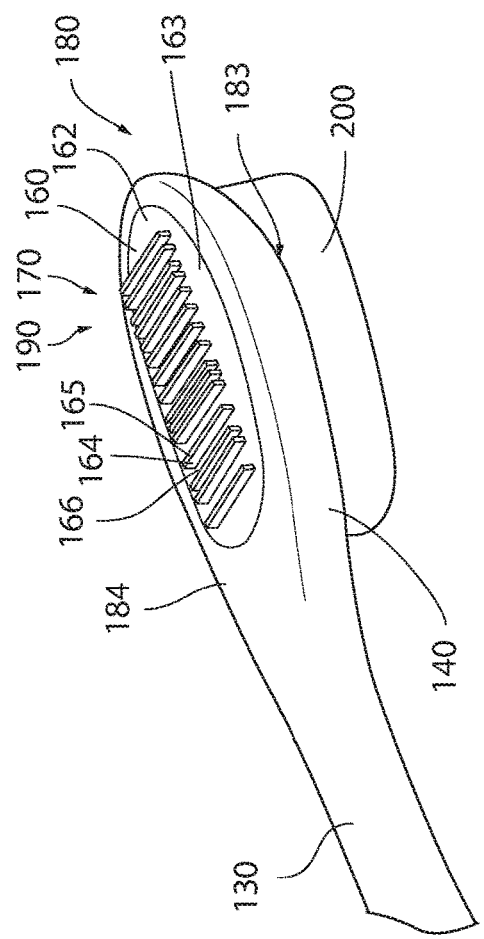
FIG. 2 shows a partial close-up perspective view of the rear of the second side of the oral care implement of FIG. 1.
Figure 3:
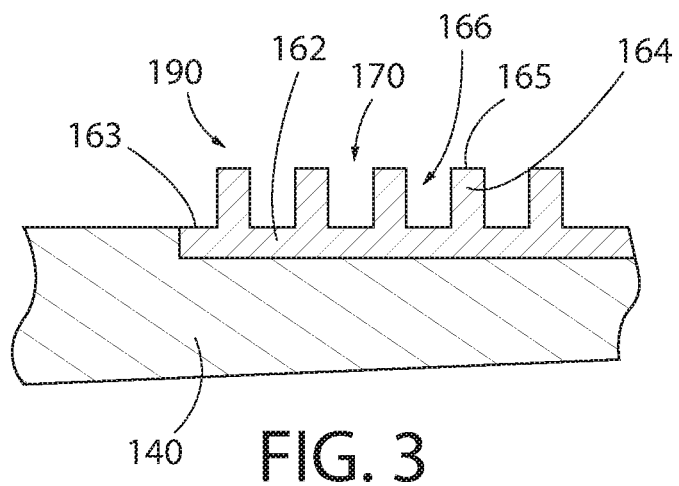
FIG. 3 shows a partial cross-sectional view of the head of the oral care implement of FIG. 2.

FIGS. 1 to 3 illustrate an oral care implement, in this case a toothbrush, according to a first embodiment of the present invention, generally designated with the reference numeral 100. The toothbrush 100 has a body 110 comprising a handle portion 120, a head portion 140 and a neck portion 130 that connects the handle portion 120 to the head portion 140. The head portion 140 is an end portion of the body 110 and is provided with a set 200 of cleaning elements for cleaning surfaces in a user's mouth, such as surfaces of their teeth. In FIGS. 1 and 2, the cleaning elements are illustrated as a simple block for clarity. However, it will be appreciated that, in reality, the set 200 of cleaning elements comprises a plurality of individually identifiable cleaning elements.

In this embodiment, the cleaning elements comprise a plurality of tooth cleaning elements, preferably a plurality of flexible, nylon bristles arranged in tufts. However, in variations to this embodiment, the tooth cleaning elements may additionally or alternatively comprise at least one of any one or more of the following, without limitation: bristles, rigid bristles, flexible bristles, filament bristles, fiber bristles, nylon bristles, spiral bristles, rubber bristles, elastomeric protrusions, elastomeric elements, flexible polymer protrusions, co-extruded filaments, flag bristles, crimped bristles, anti-bacterial bristles and combinations thereof and/or structures containing such materials or combinations.

The implement 100 has a head 180, comprising the head portion 140 of the body 110, the set 200 of cleaning elements, and a resilient material 160, each of which is described in more detail below. The implement 100 also has a handle 150, comprising the handle portion 120 of the body 110 and the thumb and rear grips 125, 127 discussed below. In variations in which the thumb and rear grips 125, 127 are omitted, the handle comprises the handle portion 120 of the body 110. The implement 100 further has a neck, comprising the neck portion 130 of the body 110.

The head portion 140 has a first, proximal end 141 and a second, distal end 142. The proximal and distal ends 141, 142 of the head portion 140 form respective proximal and distal ends 181, 182 of the head 180. The handle portion 120 has a first, proximal end 121 and a second, distal end 122. The proximal and distal ends 121, 122 of the handle portion 120 form respective proximal and distal ends 151, 152 of the handle 150. The neck portion 130 connects the distal end 122 of the handle portion 120 to the proximal end 141 of the head portion 140. The neck portion 130 is generally of a narrower cross sectional area than at least the distal end 152 of the handle 150 and, in some embodiments, the neck portion 130 is generally of a narrower cross sectional area than all of the handle 150.

The handle 150 provides the user with a mechanism by which he/she can readily grip and manipulate the toothbrush 100, includes ergonomic features which provide a high degree of control for the user while maintaining comfort, and may be formed of many different shapes and with a variety of constructions.

Generally, the toothbrush 100 extends from a proximal end 101 (which is also the proximal end 121 of the handle portion 120) to a distal end 102 (which is also the distal end 142 of the head portion 140) along a longitudinal axis A-A. Although the handle 150 is a non-linear structure in the illustrated embodiment, the longitudinal axis A-A of the implement 100 is linear in the illustrated embodiment. However, the invention is not so limited, and in certain embodiments, the implement 100 may have a simple linear handle 150 that is longitudinally aligned along the linear longitudinal axis A-A of the implement 100.

The head portion 140 is connected to the handle portion 120 via the neck portion 130. In this embodiment, the head portion 140, neck portion 130 and handle portion 120 are formed as an integral structure using an injection molding process. The head portion 140, handle portion 120 and neck portion 130 are together a single, unitary structure. That is, the body 110 is a unitary body. However, in other embodiments, the head portion 140 and the neck portion 130 together may be formed as a separate component from the handle portion 120, which separate components are operably connected at a later stage of the manufacturing process by any suitable technique known in the art, including without limitation thermal welding, sonic welding, a tight-fit assembly, a coupling sleeve, adhesion, fasteners, and a snap-fit connection. Whether the head and neck portions 140, 130 and the handle portion 120 are constructed as a single piece or a multi-piece assembly (including connection techniques) is not limiting of the present invention in all embodiments. Furthermore, other manufacturing techniques may be used in place of and/or in addition to injection molding to create the handle portion 120 and/or the head portion 140 (or components thereof) and/or the neck portion 130, such as milling and/or machining and/or additive manufacturing.

In this embodiment, the body 110 comprising each of the head portion 140, neck portion 130 and handle portion 120 is constructed of polypropylene (PP). However, in variations to this embodiment, the body 110 may instead or additionally be constructed of one or more of the following materials: polyethylene, polyamide, polyester, cellulosics, styrene-acrylonitrile (SAN), acrylic, acrylonitrile butadiene styrene (ABS) and a thermoplastic. Preferably, the body 110 is of a material that is harder than the resilient material 160. An optional thumb grip 125 is provided on a front side of the handle portion 120, and an optional rear grip 127 is provided on a rear side of the handle portion 120 opposite to the front side of the handle portion 120. The thumb and rear grips 125, 127 are non-unitary with the body 110, and may be formed of any of the materials discussed below for the resilient material 160.

The head 180 generally comprises a first side 183 and a second side 184 opposite to the first side 183. The first side 183 and the second side 184 of the head 180 can take on a wide variety of shapes and contours, none of which are limiting of the present invention. For example, the first and second sides 183, 184 can be planar, contoured or combinations thereof. The first side 183 and second side 184 are joined by a peripheral or lateral side 146 of the head portion 140, which is a peripheral or lateral side 185 of the head 180. The cleaning elements of the set 200 are provided at, and extend outward from, the first side 183 of the head 180 for cleaning contact with an oral surface, preferably teeth.

While the set 200 of cleaning elements are particularly suited for cleaning teeth, the cleaning elements can be used to clean oral soft tissue, such as a tongue, gums, or cheeks instead of or in addition to teeth. As used herein, the term "cleaning element" is used in a generic sense to refer to any structure that can be used to clean, massage or polish an oral surface, such as teeth or soft tissue, through relative surface contact.

Indeed, in a variation to the embodiment shown in FIGS. 1 to 3, instead of a set 200 of tooth cleaning elements, there is instead provided at least one soft tissue cleaning element, such as a tongue scraper comprising at least one blade. Preferably, the, or each, blade has its longitudinal length disposed so as to extend laterally across the front side 183 of the head 180. The at least one soft tissue cleaning element may have one or more proximal ends that are connected to the rest of the head in substantially the same manner as the proximal ends of the plurality of tooth cleaning elements discussed below for the first embodiment.

At the second side 184 of the head 180 is disposed a soft tissue cleaner 170. In the embodiment of FIGS. 1 to 3, the soft tissue cleaner 170 comprises the resilient material 160. The resilient material 160 comprises a pad 162 and a plurality of protrusions 164 that are unitary with the pad 162. The pad 162 is attached to the head portion 140 of the body 110 and has a surface 163. The plurality of protrusions 164 extend from the surface 163 of the pad 162 so that distal ends 165 of the protrusions 164 are spaced from the surface 163 of the pad 162. The distal ends 165 are planar and approximately parallel to the surface 163 of the pad 162. The protrusions 164 are spaced from each other by gaps 166. In the gaps 166, portions of the surface 163 of the pad 162 are visible between the protrusions 164. The resilient material 160 may be an elastomeric material, such as a thermoplastic elastomer (TPE), or styrene-ethylene/butylene-styrene (SEBS).

Preferably, there is a high degree of visual contrast between the appearance of the surface 163 of the pad 162 and at least the distal ends 165, and most preferably all, of the protrusions 164. For example, the distal ends 165, and most preferably all, of the protrusions 164 may be a different color to the surface 163 of the pad 162, or the distal ends 165, and most preferably all, of the protrusions 164 may be a lighter or darker shade of the same color as the surface 163 of the pad 162. In the embodiment of FIGS. 1 to 3, the distal ends 165 of the protrusions 164 are dark blue and the surface 163 of the pad 162 is light green. The visual contrast may be achieved either by the distal ends 165, and most preferably all, of the protrusions 164 being of a different color material to the surface 163 of the pad 162, or by the distal ends 165, and most preferably all, of the protrusions 164 having a color applied to them after forming the resilient material 160, such as by being painted or dyed.

Each of the protrusions 164 is linear, or elongate, in a direction perpendicular to the longitudinal axis A-A, i.e. in a direction parallel to a transverse direction of the implement 100. Moreover, the protrusions 164 are parallel to each other and are all approximately the same length in the direction perpendicular to the longitudinal axis A-A. Each of the protrusions 164 extends about 1.5 millimeters from the surface 163 of the pad 162. In other embodiments, each of the protrusions 164 extends more than 2 millimeters from the surface 163 of the pad 162. In other embodiments, each of the protrusions 164 extends between 0.5 and 3 millimeters, more preferably between 2.1 and 3 millimeters, from the surface 163 of the pad 162.

The protrusions 164 and the portions of the surface 163 of the pad 162 visible in the gaps 166 are dimensioned and relatively disposed so that, together, the protrusions 164 and the portions of the surface 163 of the pad 162 visible in the gaps 166 define an optical machine-readable representation of data 190 of a standard format, which is visible to the human eye. The optical machine-readable representation of data 190 comprises or represents an identifier, such as a stock keeping unit (SKU), of the oral care implement 100. In the embodiment of FIGS. 1 to 3, the protrusions 164 and the portions of the surface 163 of the pad 162 visible in the gaps 166 are configured so that the optical machine-readable representation of data 190 comprises a barcode. The protrusions 164, or at least their distal ends 165, define lines of the barcode, while the portions of the surface 163 of the pad 162 visible in the gaps 166 define spaces between the lines of the barcode. The barcode is a linear barcode, preferably of the Code 25 Interleaved standard format.

In the embodiment of FIGS. 1 to 3, the protrusions 164 are connected to the body 110 by way of the resilient material 160 being attached to the head portion 140 of the body 110. In a variation to the embodiment of FIGS. 1 to 3, the protrusions may be comprised in the head portion 140 of the body 110, as shown in FIG. 4.

Figure 4:
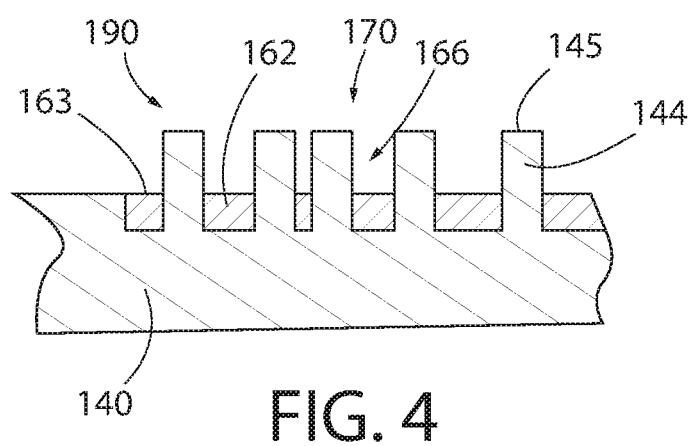
FIG. 4 shows a partial cross-sectional view of the head of an oral care implement according to another embodiment of the present invention.

In the embodiment of FIG. 4, the soft tissue cleaner 170 comprises resilient material 160 defining a pad 162 attached to the head portion 140 of the body 110 and having a surface 163. The soft tissue cleaner 170 further comprises a plurality of protrusions 144 that are unitary with the head portion 140 of the body 110 and extend through respective holes in the pad 162. The plurality of protrusions 144 extend from the head portion 140 of the body 110 so that distal ends 145 of the protrusions 144 are spaced from the surface 163 of the pad 162. The distal ends 145 are planar and approximately parallel to the surface 163 of the pad 162. The protrusions 144 are spaced from each other by gaps 166. In the gaps 166, portions of the surface 163 of the pad 162 are visible between the protrusions 144. The resilient material 160 may be an elastomeric material, such as a thermoplastic elastomer (TPE), or styrene-ethylene/butylene-styrene (SEBS).

Preferably, there is a high degree of visual contrast between the appearance of the surface 163 of the pad 162 and at least the distal ends 145, and most preferably all, of the protrusions 144. For example, the distal ends 145, and most preferably all, of the protrusions 144 may be a different color to the surface 163 of the pad 162, or the distal ends 145, and most preferably all, of the protrusions 144 may be a lighter or darker shade of the same color as the surface 163 of the pad 162. In the embodiment of FIG. 4, the distal ends 145 of the protrusions 144 are dark blue, and the surface 163 of the pad 162 is light green. The visual contrast may be achieved either by the distal ends 145, and most preferably all, of the protrusions 144 being of a different color material to the surface 163 of the pad 162, and preferably all of the resilient material 160, or by the distal ends 145, and preferably all, of the protrusions 144 having a color applied to them after they are formed, such as by being painted or dyed.

Each of the protrusions 144 is linear, or elongate, in a direction perpendicular to the longitudinal axis A-A, i.e. in a direction parallel to a transverse direction of the implement 100. Moreover, the protrusions 144 are parallel to each other and are all approximately the same length in the direction perpendicular to the longitudinal axis A-A. Each of the protrusions 144 extends about 1.5 millimeters from the surface 163 of the pad 162. In other embodiments, each of the protrusions 144 extends more than 2 millimeters from the surface 163 of the pad 162. In other embodiments, each of the protrusions 144 extends between 0.5 and 3 millimeters, more preferably between 2.1 and 3 millimeters, from the surface 163 of the pad 162.

The protrusions 144 and the portions of the surface 163 of the pad 162 visible in the gaps 166 are dimensioned and relatively disposed so that, together, the protrusions 144 and the portions of the surface 163 of the pad 162 visible in the gaps 166 define an optical machine-readable representation of data 190 of a standard format, which is visible to the human eye. The optical machine-readable representation of data 190 comprises or represents an identifier, such as a stock keeping unit (SKU), of the oral care implement 100. In the embodiment of FIG. 4, the protrusions 144 and the portions of the surface 163 of the pad 162 visible in the gaps 166 are configured so that the optical machine-readable representation of data 190 comprises a barcode. The protrusions 144, or at least their distal ends 145, define the lines of the barcode, while the portions of the surface 163 of the pad 162 visible in the gaps 166 define the spaces between the lines of the barcode. The barcode is a linear barcode, preferably of the Code 25 Interleaved standard format.

In the embodiment of FIGS. 1 to 3, the protrusions 164 are connected to the body 110, and in the embodiment of FIG. 4 the protrusions 144 are comprised in the head portion 140 of the body 110. In a variation to the embodiments of FIGS. 1 to 3 and 4, some of the protrusions are connected to the head portion 140 of the body 110 while others of the protrusions are comprised in the head portion 140 of the body 110, as shown in FIG. 5.

Figure 5:
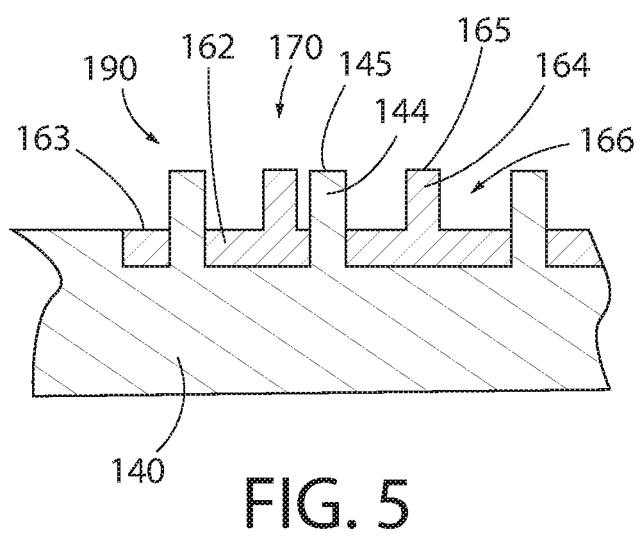
FIG. 5 shows a partial cross-sectional view of the head of an oral care implement according to another embodiment of the present invention.

In the embodiment of FIG. 5, the soft tissue cleaner 170 comprises resilient material 160. The resilient material 160 comprises a pad 162 and a first plurality of protrusions 164 that are unitary with the pad 162. The pad 162 is attached to the head portion 140 of the body 110 and has a surface 163. The soft tissue cleaner 170 further comprises a second plurality of protrusions 144 that are unitary with the head portion 140 of the body 110 and extend through respective holes in the pad 162. Each of the first plurality of protrusions 144 extends from the head portion 140 of the body 110, and each of the second plurality of protrusions 164 extends from the surface 163 of the pad 162, so that distal ends 145, 165 of the protrusions 144, 164 are spaced from the surface 163 of the pad 162. The distal ends 145, 165 are planar and approximately parallel to the surface 163 of the pad 162. The protrusions 144, 164 are spaced from each other by gaps 166. In the gaps 166, portions of the surface 163 of the pad 162 are visible between the protrusions 144, 164. The resilient material 160 may be an elastomeric material, such as a thermoplastic elastomer (TPE), or styrene-ethylene/butylene-styrene (SEBS).

Preferably, there is a high degree of visual contrast between the appearance of the surface 163 of the pad 162 and at least the distal ends 145, 165, and most preferably all, of the protrusions 144, 164. For example, the distal ends 145, 165, and most preferably all, of the protrusions 144, 164 may be a different color to the surface 163 of the pad 162, or the distal ends 145, 165, and most preferably all, of the protrusions 144, 164 may be a lighter or darker shade of the same color as the surface 163 of the pad 162. In the embodiment of FIG. 5, the distal ends 145 of the protrusions 144 are dark blue, the distal ends 165 of the protrusions 164 are dark blue, and the surface 163 of the pad 162 is light green. The visual contrast may be achieved either by the distal ends 145, 165, and most preferably all, of the protrusions 144, 164 being of a different color material to the surface 163 of the pad 162, or by the distal ends 145, 165, and most preferably all, of the protrusions 144, 164 having a color applied to them after they are formed, such as by being painted or dyed.

Each of the protrusions 144, 164 is linear, or elongate, in a direction perpendicular to the longitudinal axis A-A, i.e. in a direction parallel to a transverse direction of the implement 100. Moreover, the protrusions 144, 164 are parallel to each other and are all approximately the same length in the direction perpendicular to the longitudinal axis A-A. Each of the protrusions 144, 164 extends about 1.5 millimeters from the surface 163 of the pad 162. In other embodiments, each of the protrusions 144 extends more than 2 millimeters from the surface 163 of the pad 162. In other embodiments, each of the protrusions 144, 164 extends between 0.5 and 3 millimeters, more preferably between 2.1 and 3 millimeters, from the surface 163 of the pad 162.

The protrusions 144, 164 and the portions of the surface 163 of the pad 162 visible in the gaps 166 are dimensioned and relatively disposed so that, together, the protrusions 144, 164 and the portions of the surface 163 of the pad 162 visible in the gaps 166 define an optical machine-readable representation of data 190 of a standard format, which is visible to the human eye. The optical machine-readable representation of data 190 comprises or represents an identifier, such as a stock keeping unit (SKU), of the oral care implement 100. In the embodiment of FIG. 4, the protrusions 144, 164 and the portions of the surface 163 of the pad 162 visible in the gaps 166 are configured so that optical machine-readable representation of data 190 comprises a barcode. The protrusions 144, 164, or at least their distal ends 145, 165, define the lines of the barcode, while the portions of the surface 163 of the pad 162 visible in the gaps 166 define the spaces between the lines of the barcode. The barcode is a linear barcode, preferably of the Code 25 Interleaved standard format.

In the embodiments of FIGS. 1 to 5, portions of the surface 163 of the pad 162 are visible in the gaps 166 between the protrusions 144, 164. In a variation to these embodiments, the protrusions may be connected to the head portion 140 of the body 110 so that portions of a surface of the head portion 140 of the body 110 are visible in gaps between the protrusions, as shown in FIG. 6.

Figure 6:
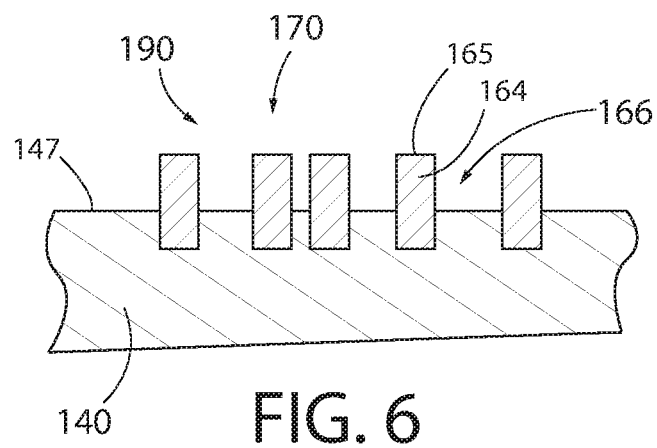
FIG. 6 shows a partial cross-sectional view of the head of an oral care implement according to a further embodiment of the present invention.

In the embodiment of FIG. 6, the soft tissue cleaner 170 comprises resilient material 160. The resilient material 160 comprises a plurality of separate, non-unitary protrusions 164 that are attached to the head portion 140 of the body 110. The protrusions 164 extend from a surface 147 of the head portion 140 so that distal ends 165 of the protrusions 164 are spaced from the surface 147 of the head portion 140. The distal ends 165 are planar and approximately parallel to the surface 147 of the head portion 140. The protrusions 164 are spaced from each other by gaps 166. In the gaps 166, portions of the surface 147 of the head portion 140 are visible between the protrusions 164. The resilient material 160 may be an elastomeric material, such as a thermoplastic elastomer (TPE), or styrene-ethylene/butylene-styrene (SEBS).

Preferably, there is a high degree of visual contrast between the appearance of the surface 147 of the head portion 140 and at least the distal ends 165, and most preferably all, of the protrusions 164. For example, the distal ends 165, and most preferably all, of the protrusions 164 may be a different color to the surface 147 of the head portion 140, or the distal ends 165, and most preferably all, of the protrusions 164 may be a lighter or darker shade of the same color as the surface 147 of the head portion 140. In the embodiment of FIG. 6, the distal ends 165 of the protrusions 164 are dark blue and the surface 147 of the head portion 140 is light green. The visual contrast may be achieved either by the distal ends 165, and most preferably all, of the protrusions 164 being of a different color material to the surface 147 of the head portion 140, or by the distal ends 165, and most preferably all, of the protrusions 164 having a color applied to them after they are formed, such as by being painted or dyed.

Each of the protrusions 164 is linear, or elongate, in a direction perpendicular to the longitudinal axis A-A, i.e. in a direction parallel to a transverse direction of the implement 100. Moreover, the protrusions 164 are parallel to each other and are all approximately the same length in the direction perpendicular to the longitudinal axis A-A. Each of the protrusions 164 extends about 1.5 millimeters from the surface 147 of the head portion 140. In other embodiments, each of the protrusions 164 extends more than 2 millimeters from the surface 147 of the head portion 140. In other embodiments, each of the protrusions 164 extends between 0.5 and 3 millimeters, more preferably between 2.1 and 3 millimeters, from the surface 147 of the head portion 140.

The protrusions 164 and the portions of the surface 147 of the head portion 140 visible in the gaps 166 are dimensioned and relatively disposed so that, together, the protrusions 164 and the portions of the surface 147 of the head portion 140 visible in the gaps 166 define an optical machine-readable representation of data 190 of a standard format, which is visible to the human eye. The optical machine-readable representation of data 190 comprises or represents an identifier, such as a stock keeping unit (SKU), of the oral care implement 100. In the embodiment of FIG. 6, the protrusions 164 and the portions of the surface 147 of the head portion 140 visible in the gaps 166 are configured so that the optical machine-readable representation of data 190 comprises a barcode. The protrusions 164, or at least their distal ends 165, define the lines of the barcode, while the portions of the surface 147 of the head portion 140 visible in the gaps 166 define the spaces between the lines of the barcode. The barcode is a linear barcode, preferably of the Code 25 Interleaved standard format.

Figure 7:
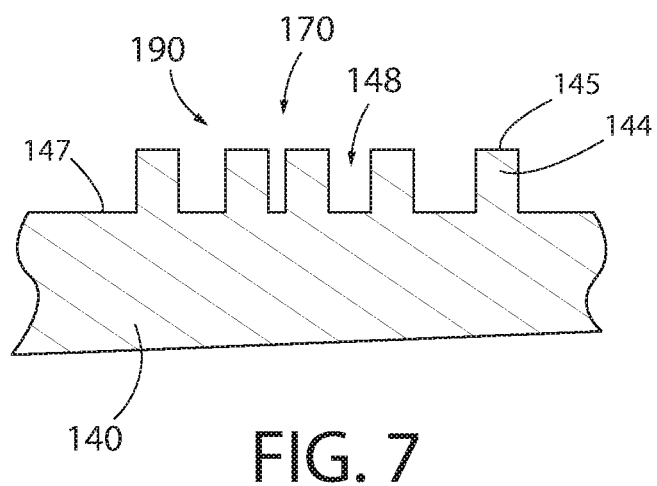
FIG. 7 shows a partial cross-sectional view of the head of an oral care implement according to yet another embodiment of the present invention.

In still further embodiments, the soft tissue cleaner 170 does not comprise resilient material but comprises only protrusions that are unitary with the head portion 140 of the body 110, as shown in FIG. 7.

In the embodiment of FIG. 7, each of the protrusions 144 extends from a surface 147 of the head portion 140 of the body 110 so that distal ends 145 of the protrusions 144 are spaced from the surface 147 of the head portion 140. The distal ends 145 are planar and approximately parallel to the surface 147 of the head portion 140. The protrusions 144 are spaced from each other by gaps 148. In the gaps 148, portions of the surface 147 of the head portion 140 are visible between the protrusions 144.

Preferably, there is a high degree of visual contrast between the appearance of the surface 147 of the head portion 140 and at least the distal ends 145, and most preferably all, of the protrusions 144. For example, the distal ends 145, and most preferably all, of the protrusions 144 may be a different color to the surface 147 of the head portion 140, or the distal ends 145, and most preferably all, of the protrusions 144 may be a lighter or darker shade of the same color as the surface 147 of the head portion 140. In the embodiment of FIG. 7, the distal ends 145 of the protrusions 144 are dark blue, and the surface 147 of the head portion 140 is light green. The visual contrast may be achieved either by the distal ends 145, and most preferably all, of the protrusions 144 being of a different color material to the surface 147 of the head portion 140, or by the distal ends 145, and most preferably all, of the protrusions 144 having a color applied to them after they are formed, such as by being painted or dyed.

Each of the protrusions 144 is linear, or elongate, in a direction perpendicular to the longitudinal axis A-A, i.e. in a direction parallel to a transverse direction of the implement 100. Moreover, the protrusions 144 are parallel to each other and are all approximately the same length in the direction perpendicular to the longitudinal axis A-A. Each of the protrusions 144 extends about 1.5 millimeters from the surface 147 of the head portion 140. In other embodiments, each of the protrusions 164 extends more than 2 millimeters from the surface 147 of the head portion 140. In other embodiments, each of the protrusions 144 extends between 0.5 and 3 millimeters, more preferably between 2.1 and 3 millimeters, from the surface 147 of the head portion 140.

The protrusions 144 and the portions of the surface 147 of the head portion 140 visible in the gaps 148 are dimensioned and relatively disposed so that, together, the protrusions 144 and the portions of the surface 147 of the head portion 140 visible in the gaps 148 define an optical machine-readable representation of data 190 of a standard format, which is visible to the human eye. The optical machine-readable representation of data 190 comprises or represents an identifier, such as a stock keeping unit (SKU), of the oral care implement 100. In the embodiment of FIG. 7, the protrusions 144 and the portions of the surface 147 of the head portion 140 visible in the gaps 148 are configured so that the optical machine-readable representation of data 190 comprises a barcode. The protrusions 144, or at least their distal ends 145, define the lines of the barcode, while the portions of the surface 147 of the head portion 140 visible in the gaps 148 define the spaces between the lines of the barcode. The barcode is a linear barcode, preferably of the Code 25 Interleaved standard format.

In variations to the above-described embodiments, the barcode may instead be a linear barcode of any one of the following standard formats: Code 25 Industrial, Code 39, Code 128, EAN, GS1 Databar and UPC. In further variations to the illustrated embodiments, the barcode may instead be a matrix code of any one of the following standard formats: Aztec Code, PDF417, QR Code and Data Matrix. In such further variations, preferably the protrusions 144, 164 are not linear or elongate, but instead the protrusions 144, 164 are arranged in a grid pattern and each of the protrusions 144, 164 has a cross sectional shape suitable for enabling the distal ends 145, 165 of the protrusions to define individual modules or components of the matrix code.

While in each of the illustrated embodiments of the present invention the optical machine-readable representation of data 190 is disposed at the second side 184 of the head 180, in other embodiments the optical machine-readable representation of data 190 may be disposed elsewhere on the head 180. Moreover, while in each of the illustrated embodiments of the present invention the optical machine-readable representation of data 190 is comprised in the head 180 of the implement 100, in other embodiments the optical machine-readable representation of data 190 may be comprised elsewhere in the implement 100, such as in the handle 150 or in the neck. In such other embodiments, the optical machine-readable representation of data 190 may be defined solely by material unitary with the body 110, solely by other material, such as resilient material, attached to the body 110, or by a combination of material unitary with the body 110 and other material, such as resilient material, attached to the body 110. Looked at another way, in some such other embodiments of the present invention, the handle portion 120 or the neck portion 130 may be substituted for the head portion 140 shown in FIGS. 3 to 7. In these other embodiments of the present invention, the optical machine-readable representation of data 190 may, or may not, be comprised in a soft tissue cleaner.

In some embodiments of the present invention, rather than being defined by protrusions and gaps therebetween, the optical machine-readable representation of data is instead comprised in a label that is provided on (e.g. adhered to) a portion of the implement 100, such as the head 180, the handle 150 or the neck. The label may be provided in a recess in the portion of the implement 100, so as to preserve the label during use of the implement 100.

Some embodiments of the present invention provide a system having (a) an oral care implement comprising an optical machine-readable representation of data, and (b) a device comprising a processor and memory storing computer readable instructions for causing the processor to process an image of the optical machine-readable representation of data to extract the data from the image. An example of such a system is shown in FIG. 8.

Figure 8:
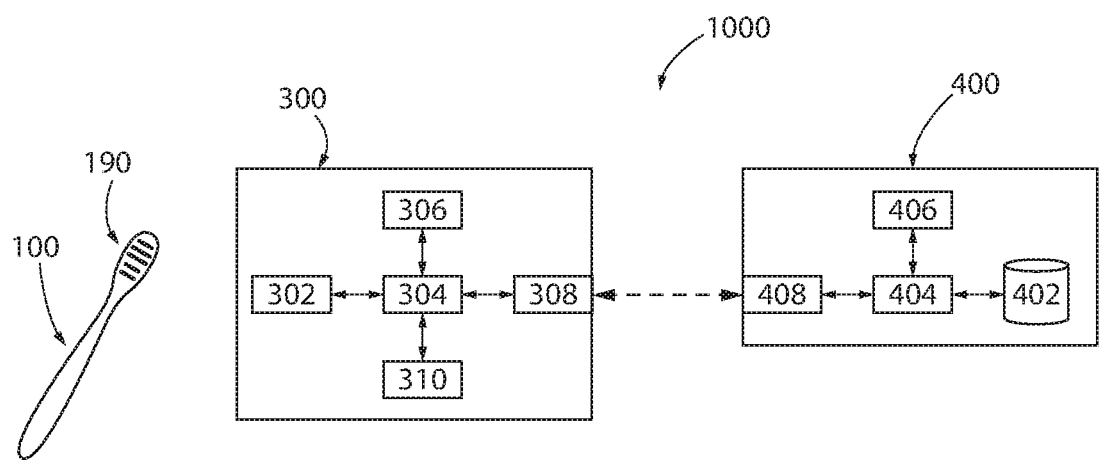
FIG. 8 shows a schematic diagram of a system according to an embodiment of the present invention.

With reference to FIG. 8, the system 1000 comprises any one of the oral care implements 100 discussed above, in which the optical machine-readable representation of data 190 comprises or represents a first identifier (in this embodiment, the SKU) of the oral care implement 100. The system 1000 further comprises a device 300, such as a mobile device or a personal computer, comprising a processor 304. Communicatively connected to the processor 304, the device 300 further comprises memory 306, a scanner or camera 302, a communications interface 308, and a user interface 310. The memory 306 stores computer readable instructions (software, such as an app) for running (execution) by the processor 304.

Although omitted in some embodiments, in the present embodiment the system 1000 further comprises a remote server 400 comprising a processor 404. Communicatively connected to the processor 404, the remote server 400 further comprises memory 406, a database 402, and a communications interface 408 for communication with the communications interface 308 of the device 300. The memory 406 stores computer readable instructions (software) for running (execution) by the processor 404. The database 402 comprises a plurality of mappings between respective different first identifiers (in this embodiment, SKUs) of different oral care implements and associated respective different second identifiers (in this embodiment, data defining different photographs) of the different oral care implements.

A user of the oral care implement 100 is able to use the device 300 to capture an image of the optical machine-readable representation of data 190 on the oral care implement 100. During this use, the processor 304 of the device 300 runs the software stored in the memory 306 of the device 300. With the camera or scanner 302 facing the optical machine-readable representation of data 190, the user is able to enter an instruction via the user interface 310, which instruction is received by the processor 304 and input into the software. The software then causes the processor 304 to control the camera or scanner 302 to capture the image. The software further causes the processor 304 to process the captured image to extract the first identifier (i.e. the SKU) comprised in or represented by the optical machine-readable representation of data 190, and causes the extracted first identifier to be stored in the memory 306. The extracted first identifier could be stored in a shopping list stored in the memory 306, so that the user can re-order the oral care implement 100 using a website.

In the present embodiment, the software further causes the processor 304 to cause the communication interface 308 to send data comprising or representing the first identifier to the processor 404 of the remote server 400 via the communications interface 408 of the remote server 400. On receipt of the data, the processor 404 of the remote server 400 executes suitable software stored in the memory 406 of the remote server 400 to cause the processor 404 to query the database 402 to find a record comprising the first identifier. On finding the record, the processor 404 extracts from the record the second identifier (i.e. data defining a photograph of the implement 100) of the oral care implement 100, which is mapped to the first identifier, and causes the communication interface 408 to send information comprising or representing the second identifier to the processor 304 of the device 300 via the communications interface 308 of the device 300. The processor 304 of the device 300 then processes the received information and causes the display 310 to display the second identifier (in this embodiment, a photograph of the oral care implement 100), so as to reassure the user that the first identifier has been correctly extracted and the oral care implement 100 has been correctly identified.

Accordingly, the oral care implement comprising an optical machine-readable representation of data aids a consumer's identification of the oral care implement and can be used to help consumers purchase other examples of the same type of oral care implement.

What is claimed is:

1. An oral care implement comprising:
   a body comprising a handle portion and a head portion; and
   an optical machine-readable representation of data located on the body.

2. The oral care implement according to claim 1 further comprising a plurality of protrusions extending from the body, the plurality of protrusions at least partially defining the optical machine-readable representation of data.

3. The oral care implement according to claim 2 wherein each of the plurality of protrusions extends from an outer surface of the body to a distal end, and wherein a portion of the outer surface of the body from which the plurality of protrusions extend visually contrasts with the distal ends of the protrusions.

4. The oral care implement according to claim 3 wherein the portion of the outer surface of the body from which the plurality of protrusions extend comprises a first color and the distal ends of the protrusions comprise a second color, the first color being a different color than the second color or the first and second colors being a different shade of the same color.

5. The oral care implement according to claim 2 wherein the plurality of protrusions are spaced apart thereby exposing a surface in gaps between the plurality of protrusions, and wherein at least distal ends of the plurality of protrusions comprise a color that is different from and visually contrasts with a color of the surface that is exposed in the gaps between the plurality of protrusions.

6. The oral care implement according to claim 1 further comprising a resilient material coupled to the body, the resilient material comprising a pad and a plurality of protrusions that are unitary with and extend from the pad, the pad and the plurality of protrusions defining the optical machine-readable representation of data.

7. The oral care implement according to claim 6 wherein the pad and distal ends of the plurality of protrusions have a visually contrasting appearance.

8. The oral care implement according to claim 6 wherein the pad comprises a first color and distal ends of the plurality of protrusions comprise a second color, the first color being a different color than the second color or the first and second colors being a different shade of the same color.

9. The oral care implement according to claim 1 wherein the body is formed of a rigid material, and further comprising a pad formed of a resilient material coupled to the body, a plurality of protrusions that are integral with the body extending through openings in the pad and protruding from an outer surface of the pad, and wherein exposed portions of the outer surface of the pad located between the plurality of protrusions comprise a first color and distal ends of the plurality of protrusions comprise a second color that visually contrasts with the first color, the plurality of protrusions and the exposed portions of the outer surface of the pad collectively defining the optical machine-readable representation of data.

10. The oral care implement according to claim 1 wherein the head portion of the body comprises a first side and a second side opposite the first side, a plurality of cleaning elements extending from the first side of the head portion, and wherein the optical machine-readable representation of data is located on the rear side of the head portion.

11. The toothbrush according to claim 1 wherein the optical machine-readable representation of data comprises or represents an identifier of the oral care implement, and wherein the identifier comprises a stock keeping unit of the oral care implement.

12. The toothbrush according to claim 1, wherein the optical machine-readable representation of data comprises a linear barcode comprising one of the following formats: Code 25 Interleaved, Code 25 Industrial, Code 39, Code 128, EAN, GS1 Databar and UPC.

13. The toothbrush according to claim 1, wherein the optical machine-readable representation of data comprises a matrix code having one of the following formats: Aztec Code, PDF417, QR Code and Data Matrix.

14. An oral care implement comprising:
a body comprising a handle portion and a head portion, the head portion having a first side and a second side opposite the first side;
a soft tissue cleaner positioned on the second side of the head portion, the soft tissue cleaner comprising a plurality of protrusions that extend from the second side of the head portion; and
wherein the plurality of protrusions of the soft tissue cleaner at least partially define an optical machine-readable representation of data.

15. The oral care implement according to claim 14 wherein the soft tissue cleaner is a monolithic structure formed of a resilient material, the soft tissue cleaner comprising a pad and the plurality of protrusions, wherein the pad is attached to the head portion of the body and the plurality of protrusions extend from an outer surface of the pad, wherein the plurality of protrusions are spaced apart from one another by gaps such that exposed portions of the outer surface of the pad are visible in the gaps, and wherein the plurality of protrusions and the exposed portions of the outer surface of the pad collectively define the optical machine-readable representation of data.

16. The oral care implement according to claim 15 wherein the exposed portions of the outer surface of the pad comprises a first color and distal ends of the plurality of protrusions comprise a second color, the first color being a different color than the second color or the first and second colors being a different shade of the same color.

17. The oral care implement of claim 14, wherein the soft tissue cleaner comprises a pad formed of a resilient material, and wherein the plurality of protrusions comprises a first plurality of protrusions that are formed integrally with the pad and a second plurality of protrusions that are formed integrally with the head portion of the body and extend through openings in the pad, the first plurality of protrusions being formed of a resilient material and the second plurality of protrusions being formed of a rigid material.

18. An oral care implement comprising:
a body comprising a handle portion and a head portion; and
a monolithic mass of elastomeric material coupled to the body, the monolithic mass of elastomeric material comprising a pad and a plurality of protrusions, the monolithic mass of elastomeric material defining an optical machine-readable representation of data.

19. The oral care implement according to claim 18 wherein the plurality of protrusions are spaced apart so that exposed portions of the pad are visible, and wherein the exposed portions of the pad comprise a first color and distal ends of the plurality of protrusions comprise a second color that is different than the first color to create a high degree of visual contract between the distal ends of the plurality of protrusions and the exposed portions of the pad.

20. The oral care implement according to claim 18 wherein the head portion comprises a first side and a second side opposite the first side, a plurality of cleaning elements extending from the first side and the monolithic mass of elastomeric material located on the second side.

* * * * *